United States Patent [19]

Banks

[11] 4,011,719

[45] Mar. 15, 1977

[54] ANODE FOR ION THRUSTER

[75] Inventor: Bruce A. Banks, Olmsted Township, Ohio

[73] Assignee: The United States of America as represented by the United States National Aeronautics and Space Administration, Washington, D.C.

[22] Filed: Mar. 8, 1976

[21] Appl. No.: 665,033

[52] U.S. Cl. .................................. 60/202; 313/230; 313/231.3; 313/360; 315/111.3; 315/111.6

[51] Int. Cl.[2] .......................................... F02K 9/00

[58] Field of Search .............. 60/202; 313/359–363, 313/230, 231.3; 315/111.3, 111.6

[56] References Cited

UNITED STATES PATENTS

| | | | |
|---|---|---|---|
| 3,156,090 | 11/1964 | Kaufman | 60/202 |
| 3,500,122 | 3/1970 | Sohl | 313/361 |
| 3,969,646 | 7/1976 | Reader et al. | 313/359 |

*Primary Examiner*—William L. Freeh
*Assistant Examiner*—Robert E. Garrett
*Attorney, Agent, or Firm*—N. T. Musial; G. E. Shook; John R. Manning

[57] ABSTRACT

The invention is directed to a screen anode for an ion thruster. The anode is constructed of a woven mesh screen, preferably of a stainless steel wire cloth with a mesh size less than the intergrid gap or openings of the screen grid or accelerator grid systems of the ion thruster. The screen anode is sputter coated with tantalum as a result of thruster operation. Because of the fineness of the screen anode any spalled material from the tantalum coated anode is in such small dimensions that the spalled pieces cannot interfere with the accelerator and screen grid systems and with the focusing therebetween.

4 Claims, 2 Drawing Figures

ANODE FOR ION THRUSTER

The invention described herein was made by an employee of the United States Government and may be manufactured and used by or for the government for governmental purposes without the payment of any royalties thereon or therefor.

BACKGROUND OF THE INVENTION

Electron bombardment ion thrusters may be employed for attitude control and station-keeping of earth synchronous satellites, and perhaps for other purposes in maneuvering satellites. The operation of ion thrusters creates problems due to sputter erosion of the thruster discharge chamber components. Erosion may impair operation of a component or structurally weaken it. Furthermore, deposits of sputtered material which build up in the discharge chamber may spall off in flakes. These flakes can short out components or may cause localized detrimental sputter erosion of the grids.

It is customary to arrange mercury ion thrusters so that all of the discharge chamber components except the anode and the cathode keeper are at or near cathode common potential. Therefore, the exposed surfaces of these components are subject to sputter erosion during thruster operation. The ions, such as mercury ions, are accelerated across the plasma sheath within the discharge chamber by the potential drop across the sheath. This sputtered material deposits on the anode, and the spalling and flaking of these deposits is essentially confined to the interior surface of the anode in mercury ion thrusters. Tests indicate that the spalled flakes of the sputter-deposited material in the discharge chamber create serious problems for long term operation. The sputtered flakes cause interference with the grid system and also seriously weaken or impair the components.

SUMMARY OF THE INVENTION

In accordance with the invention the anode in the ion thruster, usually of circularly cylindrical form, is made of a stainless steel mesh coated with tantalum. In order to provide a secure coating the stainless steel is roughened, as by sandblasting. Preferably a very fine stainless steel mesh is employed, preferably so fine as to be opaque and finer than the grid structures. By this means the tantalum coating sputtered on the anode as a result of thruster operation can only flake off in pieces smaller in dimensions than those between the links of the woven mesh, and therefore, smaller than the grid openings. Accordingly the sputtered flakes do not interfere with the operation of the ion thruster to the same degree as sputtered flakes from prior anodes, and an ion thruster using the present invention may be operated for a longer period of time.

BRIEF DESCRIPTION OF THE DRAWINGS

The foregoing and other advantages and novel features of the invention, as well as it objects, will be more fully apparent from the following detailed description when read in connection with the accompanying drawing. In the drawing.

DESCRIPTION OF THE PREFERRED EMBODIMENT

Figure 1:
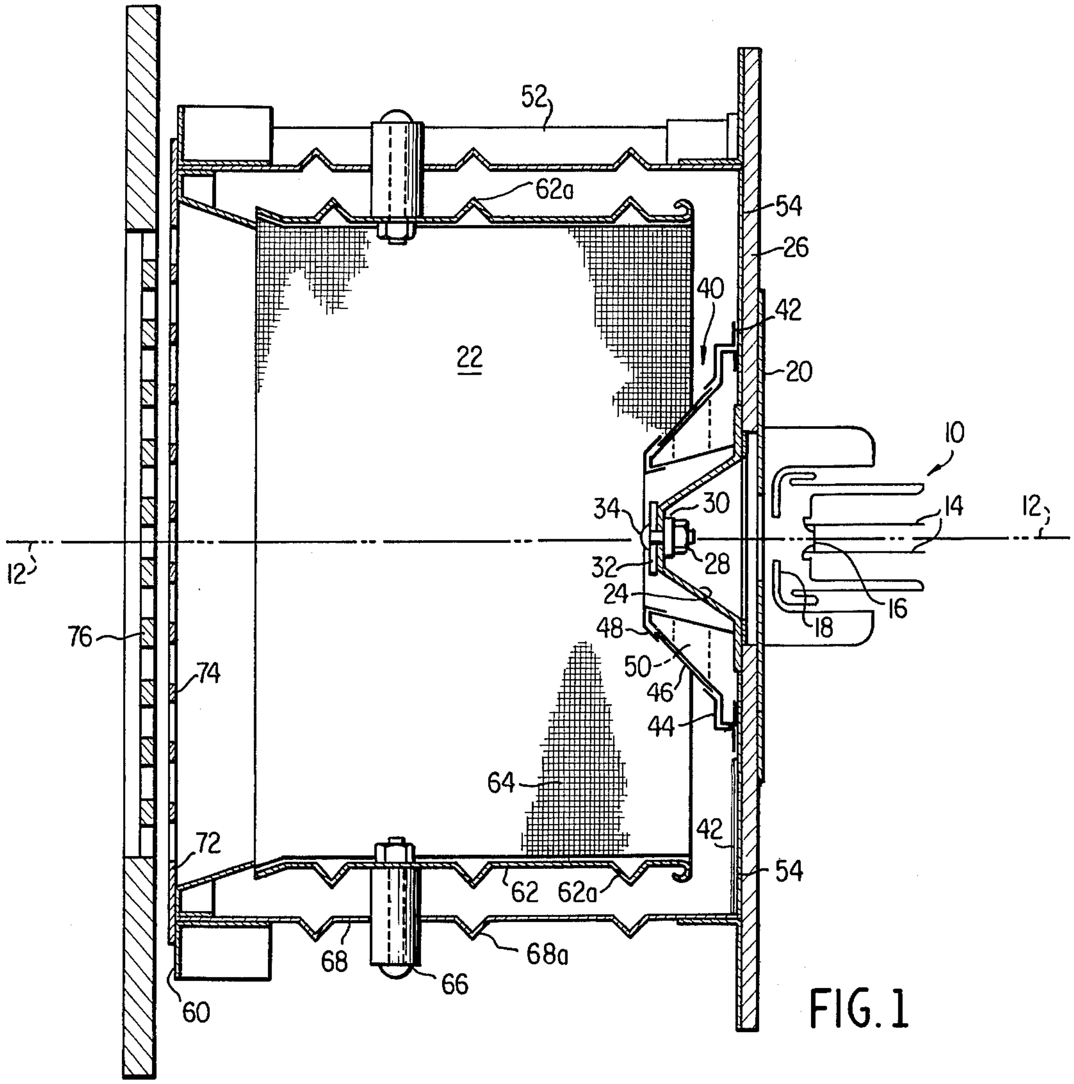
FIG. 1 is a sectional view schematically showing the various components of an ion thruster so far as required for an understanding of the present invention.

Referring to FIG. 1 a cathode assembly 10 is illustrated arranged coaxially with the ion thruster axis 12. A pair of leads 14 are arranged for supplying heater current to the tungsten cathode 16 which may be a simple tungsten hair-pin turn. A cathode-keeper 18 is arranged as a keep-alive electrode to maintain a small glow discharge between the cathode 16 and the centrally apertured cathode-keeper 18.

A spider arrangement comprising four struts or supports 24 is fastened to a thruster endplate 26. The endplate 26 is centrally apertured and carries a cathode assembly shield 20 which has a central aperture, both apertures being coaxial with the thruster axis 12 and the aperture in shield 20 being somewhat larger than that in cathode keeper 18 but smaller than the coaxial aperture in endplate 26.

The supports 24 support a baffle arrangement comprising a baffle nut 28 a baffle washer 30, a baffle 32 and a baffle screw 34. The baffle 32 is centrally apertured to receive the screw 34 the head of which bears against the baffle which is centrally apertured. The baffle 32 in turn bears against the four strut or baffle supports 24, which may lead from a common central portion, supported on the opposite side by the washer 30 and finally is threaded into the baffle nut 28 to hold the assembly so that the screw and the baffle are coaxial with the thruster axis 12 and so that the baffle 32 faces the cathode 16.

The open spaces between the struts permits the ions resulting from a suitable keep-alive voltage between cathode 16 and keeper 18 to migrate into an ion chamber 22. Nevertheless, the baffle 32 together with the cathode assembly shield 30 and the cathode keeper 18 shields the cathode from direct exposure to the field in the ion chamber 22, preventing an excess of ions from the plasma created by the keeper from entering the central area of the ion chamber 22.

A cathode pole piece assembly 40 is arranged about the periphery of the aperture in the thruster endplate 26. The cathode pole piece assembly 40 comprises an endplate cover 42 which is extended radially to cover the interior portion of the thruster endplate 26 which otherwise would be exposed to the ion chamber 22. The endplate cover is held against the thruster endplate 26 by an outer flange cover 44, a tantalum screen 46 extended angularly inward into the ion chamber 22 and the inward end extending into the chamber being covered with a tip cover 48. The tantalum screen 46 carries several flow diversion slots 50, for example in this case for slots at 90° intervals about the axis. These slots permit ions from the plasma created between keepers 18 and cathode 16 to enter the chamber 22 at a greater radial distance from the axis 12 than those entering around the baffle 32.

A plurality, for example, seven, of permanent magnets 52 are arranged around the ion chamber 22. The magnets 52 are permanent bar magnets with their longitudinal axis parallel with the thruster axis 12 and arranged symmetrically and circularly around the thruster axis 12 with all the poles of like kind facing the exit end and the other poles facing the cathode end thereby to produce a substantially axial magnetic field in the ion chamber 22. A cathode pole piece 54 of soft iron is held within the cathode pole piece assembly 40 in order to enhance and concentrate the magnetic field along and near the thruster axis 12 within the ion chamber 22. The endplate 26 is also of soft iron to assist in completing the magnetic circuit.

The anode 60 (see also FIG. 2) comprises an annular anode shell 62 and internally thereof an anode insert 64 shaped as a right circular cylinder, both arranged coaxially with axis 12. The anode insert 64 is held in place, for example, by four anode mounts 66 comprising insulators through a coaxial annular anode support 68 external to and spaced from anode shell 62. The support 68 with the thruster endplate 26 provides a mechanical framework to which the other parts are attached. The anode shell 62 and the support shell 68 are provided with folds 62*a* and 68*a* respectively circumferentially for mechanical stiffening. The anode insert 64 is in the form of a mesh screen and will be described in greater detail hereinafter.

An accelerator grid 76 is held by an accelerator grid frame 78 attached by means not shown to the thruster body 38 but with an annular anode pole piece 60 interposed. The pole piece structure 60 serves as a magnetic termination for the permanent magnets 52. It also completes the magnetic circuit at the down-stream end of the ion chamber 22 remote from the cathode 16. An annular screen grid frame 72 supports the screen grid 74 at the downstream end of ion chamber 32. The accelerator grid 76 is supported further downstream from screen grid 74 so that when suitable energized ions drawn from chamber 22 are focused by the aligned openings in the grids 74 and 76 and exit from the somewhat smaller openings in accelerator grid 76.

For the general description of the manner in which ion thrusters operate one may refer to U.S. Pat. No. 3,156,090 to Harold R. Kaufman issued Nov. 10, 1964 for Ion Rocket, and to U.S. Pat. No. 3,262,272 issued July 26, 1966 to P. D. Reader et al. for Electrostatic Ion Rocket Engine. Briefly, in the structure here illustrated, molecules of mercury from a source not shown are released into the vicinity of the cathode and thence into the ion chamber in the gaseous state. Electrons emitted from the cathode strike the mercury molecules, and one or more electrons are driven from the molecule. Hence there is created in the ion chamber 22 a plasma of mercury ions and electrons, together with mercury molecules which result from recombinations or leakage into the chamber or from the walls or ion extraction through screen electrode 74.

Electrons in the chamber 22 are accelerated toward the anode insert 64 which acts essentially as the anode, and striking mercury molecules released from the mercury source or the result of recombination, maintain the plasma. The axial magnetic field within the ion chamber 22 created by the magnets 52 tends to restrain the path of the electrons so that they are not drawn directly to the anode and by this restraint, excessive loss of electrons to the anode is prevented, while maintaining the plasma. The ions produced are drawn toward the screen grid 74 and the accelerator grid 76 which focus them and emit them through their aligned openings in a direction opposite to that from which they entered from the cathode. On their exit from the ion chamber 22 the reaction resultant from the emission of the ions affords a thrust to the rocket. Other elements which may involve detailed structure or space charge neutralization means not illustrated herein, such illustration not being necessary for an understanding of the present invention.

Figure 2:
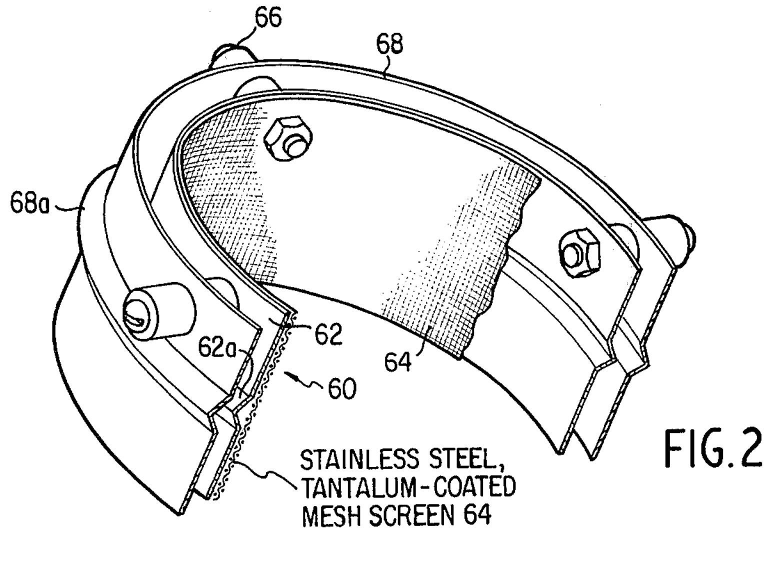
FIG. 2 is a partial perspective view of the ion thruster anode showing a mesh screen according to the invention.

Referring now to FIG. 2 there is illustrated in partial perspective view the anode mount 66 holding the anode insert or screen 64 inside of the anode shell 62 whereby the screen 64 acts as the anode being exposed to the ion chamber 22. The anode screen is a stainless steel wire cloth, double-woven.

The stainless steel wire cloth or mesh is first sandblasted with small grit particles in order to roughen the stainless steel material and improve adherence of the tantalum coating which is sputtered onto the stainless steel cloth via normal thruster operation. In one example, the stainles steel wire cloth may consist of a double woven cloth of 80 × 450 wires/cm., made of 0.045 to 0.050 mm. diameter wire. In another example a fine stainless steel wire cloth was employed but somewhat coarser being double woven 20 × 100 wires/cm., made of 0.20 to 0.25 mm. diameter wire. The stainless steel cloth is so fine as to be opaque to light. The mesh was sand blasted with grit materials of SiC having a particle size 50mm. The grit blasting in one instance was carried on for about 12 seconds at a distance from the nozzle orifice of 2.5 cm. through a 0.46 mm. diameter orifice size at a pressure of 28 Newtons per square centimeter. Thereafter the stainless steel wire cloth received a sputter deposition of tantalum to a thickness of between 2 and 30 mm. A good value was between 15 and 30 mm. thickness of tantalum coating.

For further improvement the cathode pole piece 54 was shielded by the tantalum tip cover 48 and the tantalum screen 46. The outer flange cover 44 is also of tantalum completely covering the endplate 26. The purpose of arranging all exposed pieces within the ion chamber 22 to be of tantalum is because tantalum is more resistive to the effects of ion sputtering than other substances.

Tests indicate that because of its good adherence the tantalum coating on the wire mesh screen tends to spall if at all in tiny pieces commensurate with the distance between mesh interstices. This distance is less than the dimensions across the screen openings. The spalled pieces therefore are small and tend to interfere if at all in only a minor way with operation of the ion thruster. In particular they are too tiny to lodge in or cover the openings in the grids. A further description of experimental results and tests will be found in NASA Technical Memorandum NASA TM X-71675 entitled Solutions for Discharge Chamber Sputtering and Anode Deposit Spalling in Small Mercury Ion Thrusters by John L. Power and Donna J. Hiznay and also NASA Technical Memorandum NASA TM X-3269 entitled Accelerated Life Test Of Sputtering and Anode Deposit Spalling in a Small Mercury Ion Thruster by John L. Power. Briefly, the tests indicate that the ion thruster according to the invention provides longer operation than prior thrusters which do not employ the grit blasted fine-meshed screen.

What is claimed is:

1. In an ion thruster comprising an ion discharge chamber within which ions are to be formed, ion focusing screens in communication with said discharge chamber and an anode within said discharge chamber, said anode comprising a mesh screen.

2. In the ion thruster as claimed in claim 1, said anode screen having a mesh fineness smaller than the spaces in said focusing screens.

3. In an ion thruster as claimed in claim 2, said stainless steel mesh being a stainless steel double woven cloth the wires thereof being no greater than 0.20 mm. diameter and at least 20 × 100 wires/cm. or more.

4. In an ion thruster as claimed in claim 2, said mesh screen being coated with tantalum.

* * * * *